Patented Aug. 18, 1925.

1,550,268

UNITED STATES PATENT OFFICE.

HEINRICH KRÄMER AND ADOLF REIFFEN, OF ELBERFELD, GERMANY.

DECOMPOSITORY PROCESS FOR WORKING UP FISH WASTE.

No Drawing.  Application filed September 13, 1923. Serial No. 662,575.

*To all whom it may concern:*

Be it known that we, HEINRICH KRÄMER and ADOLF REIFFEN, citizens of Germany, and residents of Elberfeld, Germany, have invented certain new and useful Improvements in Decompository Processes for Working Up Fish Waste, of which the following is a specification.

Formerly fish waste was used either as cattle feed or as fertilizer. To-day it is worked into fish-oil and most of all, through preserving processes, into fish meal or fish guano, undeveloped nitrogen and phosphoric-acid-containing fodder or fertilizers. In the manufacture of fish-oil or cod-liver-oil, for instance, from fish liver, the principal question is that of separating the oil by melting, steaming or boiling the livers; the nitrogen-containing organic residuum, the oil grout, is not worked up; this too, in a dried condition, is used as undeveloped fertilizer.

The invention relates to a chemical process for the utilization of fish or fish waste, and is principally designated by the fact that on the one hand the organically latent nitrogen of the fish substance is exploited, while on the other hand in the course of the process additional, partly very valuable, substances are obtained, through which the economy of the process is advantageously influenced.

The course of the process is materially as follows:

The fish or fish waste is mixed with an excess quantity of water (for instance at a ratio of 1:3), then left standing in open or closed receptacles at a temperature of 30–60° C. for several days (about two to three), during which time it may be stirred at intervals, until a broth forms in which the fish substance is dissolved, the flesh-cleaned bones settling on the bottom of the receptacle and whatever oil there is collecting on the surface.

The procedure takes the form of a hydrolytic splitting up of the fish substance, whereby the glue-like constituents of the fish flesh are dissolved and the fish albumen is subjected to a chemical change.

The process takes its course with the evolution of carbon dioxide, while sulphide of hydrogen, ammonia and amine are hardly or not at all traceable. Through this latter circumstance the procedure is contrary to that of fish decay, in the case of which, similar to the usual meat decay, the above mentioned combinations as well as foul smelling decayed matter form, leaving a repugnant decompository matter, the working up of which is impossible for sanitary reasons.

The described method, furthermore, is wholly different from the well known cooking or boiling of fish waste. According to the present method, fish broths or soups are produced in which large or small particles of the fish flesh are suspended. The breaking up of this flesh is chiefly, however, purely external and hydrolytic, the degree of decomposition being very small. This is chemically proved by the fact that the ammonia products that may be driven out of the above-named cooked-fish broths by alkaline distillation constitute but a very small fraction of the total nitrogen of the materials originally employed. The fish nitrogen can not be removed by boiling processes.

The main effect of the procedure is based upon the fact that the total nitrogen of the original material is contained in the fish broth which forms, and is obtained by later treatment in the form of ammonia and amines. At the same time the new process provides the possibility of procuring also the other constituents of the original matter, such as oil, bone, ester, sebacic-acid-containing oils, combustible gases, etc.

We claim:

1. A method of treating fish flesh that comprises mixing the fish flesh with substantially three parts of water, subjecting the mixture to a temperature of substantially 30° to 60° C. for several days, and stirring at intervals to produce a broth in which the fish flesh is dissolved.

2. A method of treating fish flesh that comprises dissolving the glue-like constituents of the fish flesh and subjecting the fish albumen to chemical change to hydrolytically split up the fish flesh without substantial decomposition, whereby substantially all of the nitrogen of the flesh is retained.

3. A method of treating fish flesh that comprises mixing the fish flesh with an excess of water and subjecting the mixture to a temperature of substantially 30° to 60° C. to produce a broth in which the fish flesh is dissolved.

4. A method treating fish flesh that comprises mixing the fish flesh with an excess of water, subjecting the mixture to a temperature of substantially 30° to 60° C. and slowly stirring to produce a broth in which the fish flesh is dissolved.

5. A method of treating fish flesh that comprises mixing the fish flesh with substantially three parts of water and subjecting the mixture to a temperature of substantially 30° to 60° C. to produce a broth in which the fish flesh is dissolved.

6. A method of treating fish flesh that comprises mixing the fish flesh with an excess of water, and subjecting the mixture to a temperature of substantially 30° to 60° C. for a period of substantially two or three days, until the breaking up of the fish flesh is complete, to produce a broth in which the fish flesh is dissolved.

Dr. HEINRICH KRÄMER.
Prof. Dr. ADOLF REIFFEN.